United States Patent [19]

Tayloe et al.

[11] Patent Number: 5,826,188

[45] Date of Patent: Oct. 20, 1998

[54] METHOD AND APPARATUS FOR HANDING OFF CALLS BETWEEN DIFFERING RADIO TELECOMMUNICATION NETWORKS

[75] Inventors: Daniel Richard Tayloe, Phoenix; Johanna Alexandra Wild, Scottsdale; James William Bishop, Jr., Chandler, all of Ariz.; William Neil Robinson, Farnham, United Kingdom

[73] Assignee: Motorola, Inc., Schaumburg, Ill.

[21] Appl. No.: 568,928

[22] Filed: Dec. 7, 1995

[51] Int. Cl.$^6$ .................................................. H04B 7/185
[52] U.S. Cl. .......................... 455/428; 455/430; 455/436; 455/440
[58] Field of Search .................................. 455/33.1–33.4, 455/54.1, 54.2, 56.1, 12.1, 13.1, 428, 430, 432, 433, 436, 439, 440, 437, 443, 438; 370/331, 339; 379/59, 60

[56] References Cited

U.S. PATENT DOCUMENTS

| | | | |
|---|---|---|---|
| 5,189,734 | 2/1993 | Bailey et al. | 455/438 |
| 5,287,541 | 2/1994 | Davis et al. | 455/13.1 X |
| 5,526,404 | 6/1996 | Wiedeman et al. | 455/430 |
| 5,561,836 | 10/1996 | Sowles et al. | 455/12.1 |
| 5,594,718 | 1/1997 | Weaver, Jr. et al. | 455/437 |
| 5,649,308 | 7/1997 | Andrews | 455/84 |

*Primary Examiner*—Thanh Cong Le
*Attorney, Agent, or Firm*—Sherry J. Whitney

[57] ABSTRACT

A method for handing off calls between differing radio telecommunication networks recognizes (302) a desire for an inter-network hand-off. When a Subscriber Unit (120) (SU) identifies (304) a new network, a hand-off with the new network can be requested (320). When the SU (120) does not identify (304) a new network, the old network requests (314) location information relevant to an inter-network hand-off from a Location Inter-Working Server (200) (LIWS). The LIWS (200) provides information about other networks which provide service to the SU location and, when another network provides service to the SU location, a hand-off with the other network can be requested (320).

38 Claims, 6 Drawing Sheets

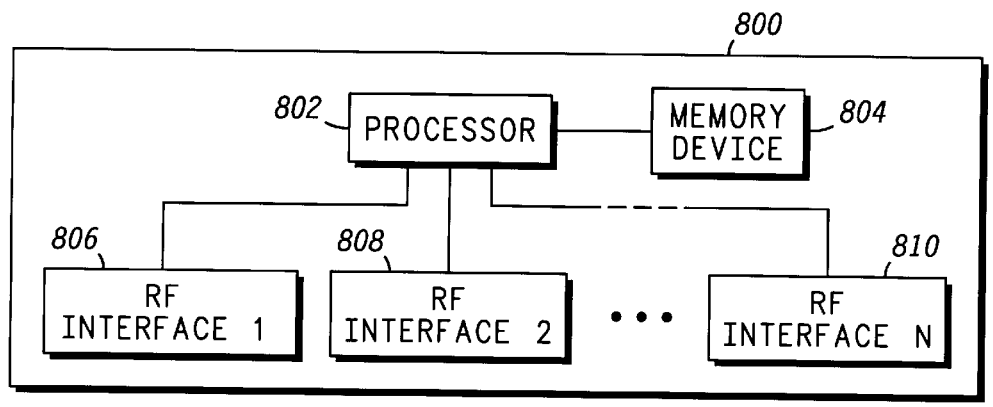
FIG. 8
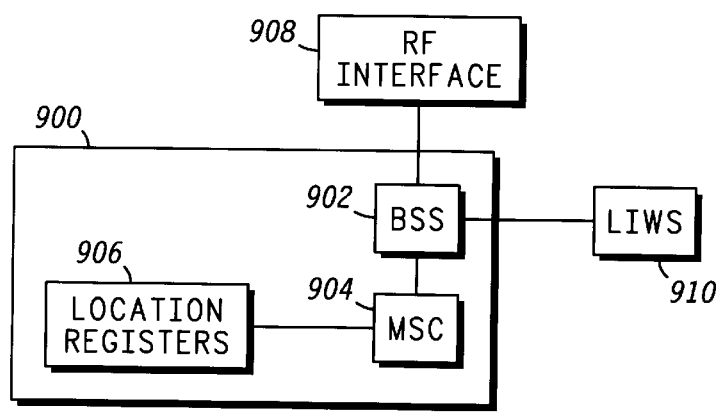
FIG. 9
FIG. 10
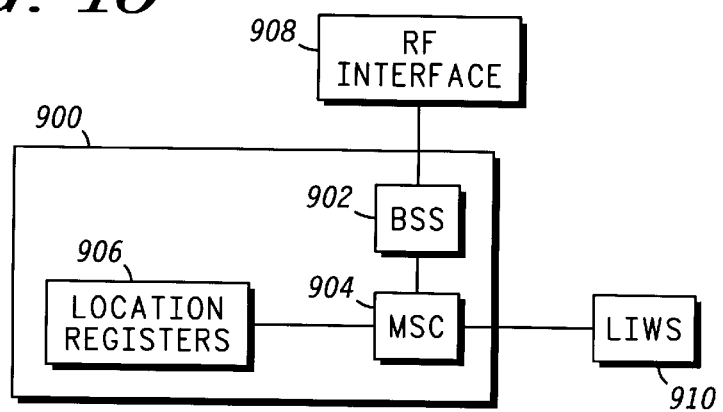

5,826,188

METHOD AND APPARATUS FOR HANDING OFF CALLS BETWEEN DIFFERING RADIO TELECOMMUNICATION NETWORKS

CROSS-REFERENCE TO RELATED APPLICATIONS

This invention is related to co-pending U.S. Patent Application entitled "Method and Apparatus for Providing Location Inter-Working Information Between Differing Radio Telecommunication Networks", filed concurrently herewith and assigned to the same assignee as the present invention.

FIELD OF THE INVENTION

This invention relates generally to radio telecommunications and, more particularly, to handing off calls between multiple differing radio telecommunications networks.

BACKGROUND OF THE INVENTION

A "network" is defined herein as a particular radio telecommunication service provider, including its air interface standard. A "system" is defined herein as a combination of networks.

An "air interface standard" is defined by a modulation scheme and frequency band employed by a particular network. Common modulation schemes used by various radio telecommunication networks include TDMA, FDMA, CDMA, AMPS (analog cellular), and GSM. Frequency bands typically are in either the 900 MHz or 1900 MHz ranges.

As used herein, a "locational standard" or "locational format" is the standard by which a particular network describes the location of a subscriber unit (SU). For example, some networks describe an SU location by using a latitude and longitude measurement, while other networks define an SU location by identifying a cell which the SU is located within.

A variety of radio telecommunication networks have been developed to offer convenient mobile communications capabilities. Terrestrial networks, such as GSM, provide communication cells to SUs using ground-based cellular equipment. More recently, satellite networks are being developed in which an SU communicates directly with a satellite which enables communications between the SU and the rest of the network.

Each communication network provides service to SUs within a particular coverage area. Terrestrial networks typically have coverage areas which are limited by physical obstructions and antenna expense. Thus, terrestrial networks are generally used in populated areas and along thoroughfares. Satellite networks are not as limited by physical obstructions or antenna expense. Thus, some proposed satellite networks intend to provide service to users across all or a substantial portion of the earth's surface.

The coverage areas of differing communication networks often overlap. However, prior-art SUs cannot operate with networks using differing air interface standards. In addition, networks which use differing locational standards are unable to share information which is necessary for SU hand-offs and other applications. Thus, for example, a prior-art SU would be unable to initiate a call using a terrestrial radio telecommunication network and later hand-off to a satellite network when the SU moves out of the coverage area of the terrestrial network. In addition, a prior-art SU would be unable voluntarily to transition from using a first network to using a second network which provides a better service rate if the second network uses a differing air interface standard or a differing locational standard.

To at least partially resolve these problems, "multi-mode" SUs are being developed which would enable an SU to operate using multiple air interfaces. However, a major obstacle to enabling a multi-mode or a single-mode SU to use networks having differing air interface standards or differing locational standards is that location information between networks is not shared and is generally in a network-unique format.

In some prior-art communication networks, the same network operator can internally support multiple air interface standards such as AMPS (standard analog cellular) and NAMPS (narrow-band analog cellular), and/or channels using multiplexing schemes (e.g., TDMA, FDMA, or CDMA). The operator may allow hand-offs between channels within the network or hand-offs to a compatible radio telecommunication network down the road. However, no prior-art system enables hand-offs between networks having differing air interfaces (e.g., hand-offs between a terrestrial and a satellite radio telecommunication network) or differing locational standards. Thus, what is needed is a method and apparatus for enabling inter-network hand-offs between networks having differing air interface standards or differing locational standards. Additionally needed is a method and apparatus for mapping SU location data from a first network to a second network having a differing locational standard to enable the inter-network hand-offs to occur.

BRIEF DESCRIPTION OF THE DRAWINGS

FIG. 8 illustrates a multi-mode SU in accordance with a preferred embodiment of the present invention;

FIG. 9 illustrates a GW in accordance with a preferred embodiment of the present invention; and FIG. 10 illustrates a GW in accordance with an alternate embodiment of the present invention.

DETAILED DESCRIPTION OF THE DRAWINGS

The method and apparatus of the present invention enables a subscriber unit (SU) to hand-off a call between two communication networks having different air interfaces and/ or using differing locational standards. In a preferred embodiment, the method and apparatus of the present invention enables a network to receive location inter-working information for another network which can be used to effect a network-to-network hand-off. In another preferred embodiment, the method and apparatus of the present invention allows an SU to change modulation schemes and to communicate on networks having differing air interfaces. The method and apparatus of the present invention applies to both a multi-mode SU and an SU which can communicate using only a single air interface.

Enabling an SU to hand-off to differing networks is highly desirable. For example, where multiple networks cover a particular area, the hand-off method and apparatus of the present invention enables an SU to use a competing network which offers the lowest service rate. The hand-off method and apparatus of the present invention also enables an SU to travel outside the coverage area of a first communication network while being seamlessly handed off to a second communication network. The hand-off method and apparatus of the present invention enables greater communication coverage while allowing an SU to use a competing network with the lowest service rate.

The hand-off process between two different networks raises several problems. For one thing, different locational standards are used. In other words, each network maintains SU locations in a network-unique form. For example, satellite networks often determine an SU's location with respect to known boundaries or grid-lines transposed on the surface of the earth. Terrestrial networks, on the other hand, generally determine an SU's location based on the cell in which the SU is communicating. Because knowledge of the location of the SU is critical to providing service by either network, a hand-off from one network to the other would require some type of location translation. The location translation problem is quite complex, considering the disparate size, location, and motion of satellite-based versus terrestrial-based cells.

One possible solution might be to require that each network maintain knowledge of the cell locations of all other networks with which an SU might wish to inter-operate. Each network would be required to correlate its location information with the cell locations of the other networks. However, maintaining cell location knowledge and correlating between the location data for other networks would likely require significantly more computing resources and memory storage capabilities than a network would want to allocate.

Figure 1:
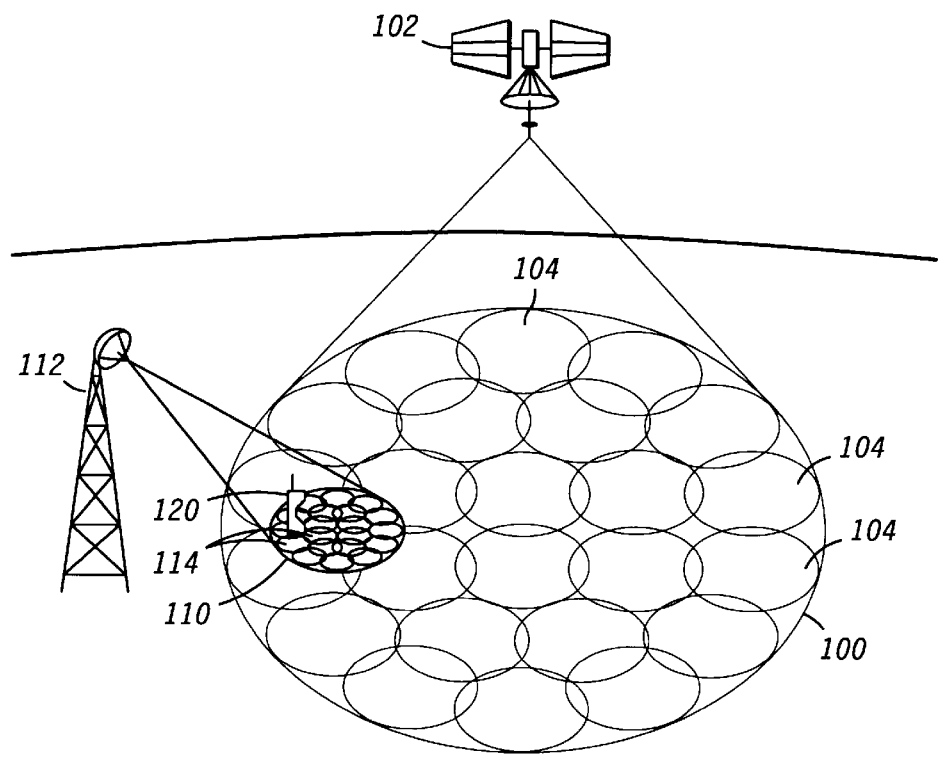
FIG. 1 illustrates a satellite cellular footprint with an overlapping terrestrial cellular footprint in accordance with a preferred embodiment of the present invention.

Correlating location information between networks would be particularly complex for a terrestrial and a satellite network attempting to inter-operate. The disparate size, location, and motion of satellite-based versus terrestrial cells would make correlation of ground-based and satellite-based cells by each network very difficult The method and apparatus of the present invention solves the problems associated with inter-network hand-offs and is discussed in conjunction with FIGS. 1–10. FIG. 1 illustrates satellite cellular footprint 100 with overlapping terrestrial cellular footprint 110 in accordance with a preferred embodiment of the present invention. Satellite cellular footprint 100 is projected by satellite 102 and includes satellite cells 104. Terrestrial cellular footprint 110 is projected by terrestrial antenna 112 and includes terrestrial cells 114. Typically, terrestrial cells 114 are relatively small (e.g., micro-cells or pico-cells which can measure as small as 300 yards or less) when compared with satellite cells 104 (e.g., a satellite cell can measure several hundred miles across).

Subscriber unit 120 (SU) is located in both satellite cellular footprint 100 and terrestrial cellular footprint 110. The approximate location of SU 120 can be determined in several ways. For example, the SU location can be determined by identifying which satellite cell 104 SU 120 is located within. Similarly, the SU location can be determined by identifying which terrestrial cell 114 SU 120 is located within. The SU location can also be determined using triangularization (e.g., Global Positioning System (GPS)) or other methods (e.g., by using Doppler frequency shift and time delay measurements between SU 120 and satellite 102).

For an SU to communicate using both networks, SU location information must be able to be mapped to both networks. Mapping between a coarse cell (e.g., satellite cell 104) and a small cell (e.g., terrestrial cell 114) can prove to be difficult. Although a smaller terrestrial cell 114 could map directly into a larger satellite cell 104 with a relative amount of ease, the converse is not true. For example, if the only knowledge of an SU's location is the identity of a large satellite cell 104, the identity of the smaller terrestrial cell 114 in which the SU is located is not ascertainable.

Location mapping between networks is complicated because often, correlation between cell locations of one network and another will change with time. For example, network configuration changes can cause cell locations to shift The challenge of mapping location information between terrestrial and satellite networks is made more difficult when non-geosynchronous satellites are used in the satellite network. Because non-geosynchronous satellite cells 104 change shape or move across the surface of the earth as a satellite proceeds in its orbit, a particular satellite cell 104 might only temporarily map to a particular terrestrial cell 114.

The method and apparatus of the present invention overcomes the obstacles of the prior art and enables location inter-working data to be exchanged between multiple networks without the need for each network to maintain knowledge of the cell locations of other networks.

Figure 2:
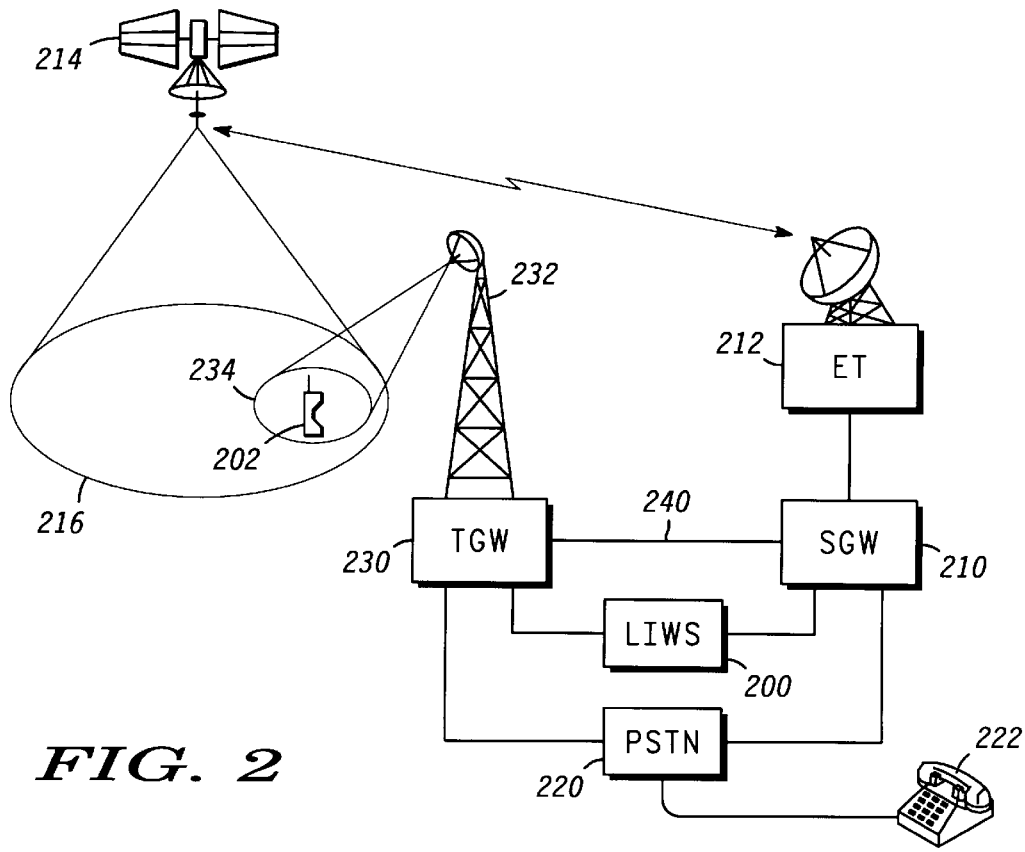
FIG. 2 illustrates multiple communication networks interfaced together using a location inter-working server LIWS) in accordance with a preferred embodiment of the present invention.

In a preferred embodiment, the method and apparatus of the present invention is carried out using a Location Inter-Working Server (LIWS) which a network can contact to receive location inter-working information for another network. FIG. 2 illustrates multiple communication networks interfaced together using LIWS 200 in accordance with a preferred embodiment of the present invention. As shown in FIG. 2, both a satellite network and a terrestrial network provide communication channels to SU 202. The satellite network and terrestrial network are radio frequency (RF) networks which can, but need not be, cellular communication networks.

In a preferred embodiment, SU 202 is a RF telephone, radio, or pager adapted to communicate over networks having differing air interface standards. A preferred embodiment of SU 202 is described in detail in conjunction with FIG. 8.

The satellite radio telecommunication network includes satellite gateway 210 (SGW), earth terminal 212 (ET), and satellite 214. SGW 210 is a switching facility which interfaces the satellite network with other communication networks (e.g., PSTN 220 or another radio telecommunication network). SGW 210, thus, enables SU 202 to communicate with conventional telephone 222 and with other communication devices (e.g., RF telephones and pagers).

SGW 210 desirably controls ET 212. ET 212 provides an RF interface between SGW 210 and satellite 214. Satellite 214 provides at least one communication channel to SU 202. In a preferred embodiment, communication channels are provided by projecting beams toward SU 202 which result in footprint 216 on the surface of the earth.

The terrestrial radio telecommunication network includes terrestrial gateway 230 (TGW) and RF antenna 232. TGW 230 is functionally the same as SGW 210. TGW 230 is a switching facility which interfaces the terrestrial network with other communication networks and enables SU 202 to communicate with conventional telephone 222 and with other communication devices. The function and apparatus associated with a terrestrial and satellite GW is described in detail in conjunction with FIGS. 9–10.

TGW 230 desirably controls RF antenna 232. RF antenna 232 provides at least one communication channel by projecting beams toward SU 202 which result in footprint 234 on the surface of the earth.

Although both the satellite network and the terrestrial network could be capable of providing communication channels to an SU, prior art SUs are unable to use the communication channels of both types of networks. One reason is that the air interface standards for the two networks generally differs. Prior art SUs do not include the hardware necessary to operate using multiple air interfaces. Another reason is that prior art SUs are unable to hand-off between networks which use differing locational standards to describe SU locations.

The method and apparatus of the present invention overcomes the deficiencies in the prior art by providing a Location Inter-Working Server 200 (LIWS) which is accessible by multiple networks, and which is capable of converting location information from one network to the location standard of a differing network. In addition, the method and apparatus of the present invention provides an SU which is capable of handing-off between networks having differing air interface standards. The applications for the location inter-working capability in the area of network-to-network hand-offs will be described in detail below.

Referring back to FIG. 2, LIWS 200 is connected between SGW 210 and TGW 230. When location translation is desired, either SGW 210 or TGW 230 can contact LIWS 200 and provide LIWS 200 with relevant information (e.g., location data in a network-unique format). LIWS 200 then performs the desired location inter-working function and supplies the result to the requester.

Connection 240 is also shown between SGW 210 and TGW 230. This connection 240 is desirable so that SGW 210 and TGW 230 can exchange messages and data. In a preferred embodiment, GWs communicate through a packet network (e.g., Signaling System #7) which route messages between GWs. In an alternate embodiment, messages and data could be exchanged through LIWS 200 and connection 240 would be unnecessary.

As shown in FIG. 2, LIWS 200 provides a location inter-working interface between a satellite network and a terrestrial network. It is important to realize that LIWS 200 can provide a location inter-working interface between any type and any number of networks having differing locational standards or differing air interface standards. In a preferred embodiment, LIWS 200 is a separate device as shown in FIG. 2. In alternate embodiments, LIWS 200 can be co-located with a particular GW, or distributed between multiple GWs.

As used herein, the terms "old network" and "old GW" are defined as the network and GW that an SU is handing off from, and the terms "new network" and "new GW" are defined as the network and GW that the SU is handing off to.

FIGS. 3–7 illustrate methods of using an LIWS in preferred and alternate embodiments of the present invention to enable an SU to hand-off between networks having differing air interface and/or locational standards. Each figure covers various embodiments from the perspective of different system components.

Figure 3:
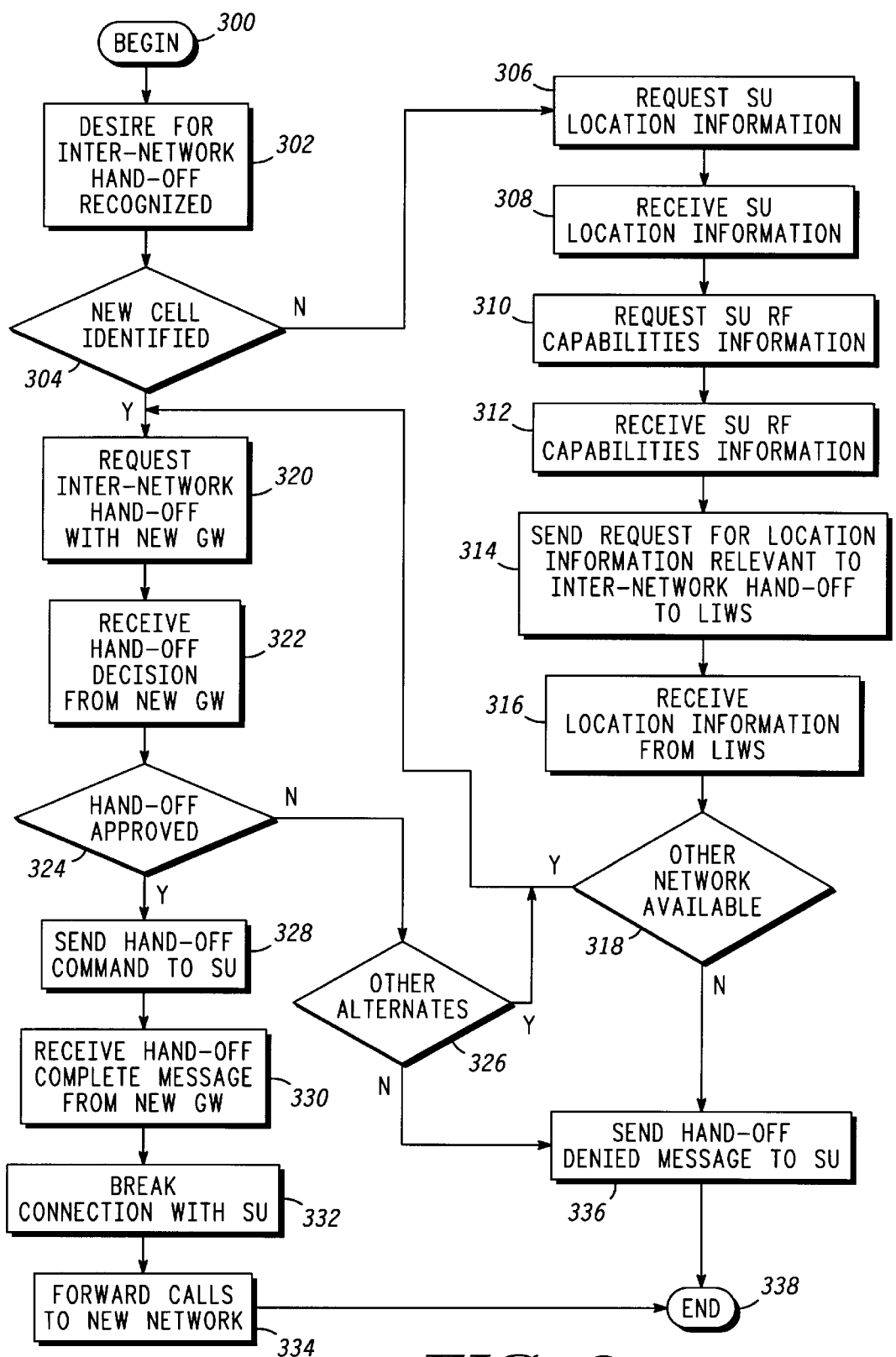
FIG. 3 illustrates a flowchart of a method for an old gateway (GW) to enable an SU to hand-off a call between networks in accordance with a preferred embodiment of the present invention.

FIG. 3 illustrates a flowchart of a method for an old GW to enable an SU to hand-off a call between networks in accordance with a preferred embodiment of the present invention. The method begins 300 when the old GW recognizes a desire for an inter-network hand-off in step 302. In a preferred embodiment, an inter-network hand-off can be initiated by either an SU or by a GW. When the hand-off is initiated by an SU, the old GW recognizes that an inter-network hand-off is desired when the old GW receives an inter-network hand-off request message from an SU.

An SU might desire an inter-network hand-off, for example, when an SU power measurement of the communication channel indicates that the channel is fading. As another example, in a preferred embodiment, the SU is capable of determining that it is located in an area where one or more alternate networks can provide higher quality service or service at a lower rate. As part of the inter-network hand-off request, the SU can specify the alternate network to which the SU prefers to be handed off. When the SU is capable of determining which cell of the alternate network the SU is located within, the SU can also send the alternate cell identification number in the inter-network hand-off request. The ability of an SU to monitor other networks is described in more detail in conjunction with FIGS. 6 and 8.

An old GW also can desire an inter-network hand-off, at which time the old GW can initiate the hand-off. An old GW might desire an inter-network hand-off, for example, when the old GW wants to shed some of the traffic load which the old GW is supporting. An old GW might want to load shed, for example, if a scheduled or unscheduled service outage is occurring or will occur in the near future. Another reason an old GW might want to load shed is when the old GW is experiencing higher than desired traffic volume. An old GW might choose to load shed when traffic volume will soon exceed network capacity. As another example, an old GW that wants to maintain a certain number of channels for high-priority users might load shed some lower-priority users.

An old GW might also desire an inter-network hand-off when a channel power measurement indicates that the old GW is not able to provide high-quality service to the SU (e.g., the SU is moving out of the coverage area of the old GW).

Referring back to FIG. 3, whether the inter-network hand-off is initiated by an SU or the old GW, the old GW then determines, in step 304, whether the SU has identified a particular cell of a new network which the SU is located within and to which the SU wants to hand-off. When the SU has identified a particular cell, the method skips steps 306-318 and resumes at step 320 as shown in FIG. 3. How an SU determines a cell in a new network within which the SU is located is described in detail in conjunction with FIG. 6.

If the SU has not indicated a cell to which the SU wishes to hand-off, the old GW determines RF capabilities and location information for the SU, by performing steps 306–312 in a preferred embodiment. In step 306, the old GW requests SU location information from the SU. The old GW then receives, in step 308, a message from the SU containing SU location information. How an SU determines location information is described in detail in conjunction with FIG. 6.

In another embodiment, the old network can use some other method to determine SU location without interaction with the SU. For example, the old network may employ triangularization techniques to determine SU location. In a satellite communication system, a satellite can collect Doppler frequency shift and time delay measurements which are used to determine SU location. Other network-controlled methods of determining SU location can also be used.

In step 310, the old GW requests SU RF capabilities information from the SU. A message including the SU RF capabilities is received in step 312. The SU RF capabilities indicate which air interface or interfaces the SU is capable of communicating over. For example, a particular SU might be capable only of communicating using a TDMA modulation scheme at 900 MHz. The SU RF capabilities message would indicate this limitation. As another example, a particular SU might be capable of communicating using both CDMA and GSM modulation schemes at 900 MHz and 1900 MHz. The SU RF capabilities message would indicate all modulation schemes and frequency bands at which the SU is capable of operating. In a preferred embodiment, the SU RF capabilities information can be ordered to indicate which modulation schemes and/or frequency bands the SU prefers to use. The preferential ordering can be taken into account by the LIWS as is described in conjunction with FIG. 4.

In an alternate embodiment, an SU might automatically send location and/or RF capabilities information to the old GW when an inter-network hand-off is desired. In this alternate embodiment, steps 306 and 310 would be unnecessary.

In other alternate embodiments, the old GW can request the RF capabilities information and/or location information in a single request message to the SU, and the SU can include the information in a single message to the old GW. Note that steps 306–312 can be carried out in different orders without departing from the scope of the present invention.

In another alternate embodiment, the old GW maintains current RF capabilities and/or location information for the SU in a database and some or all of steps 306–312 are unnecessary. Numerous ways of determining SU location and RF capabilities can be used. Which particular methods are employed are not critical to the present invention.

Referring back to FIG. 3, regardless of the source of SU location information and SU RF capabilities information, in step 314, the old GW sends a request for inter-network location information relevant to an inter-network hand-off to an LIWS. The request contains the SU location information and SU RF capabilities information in a preferred embodiment. In alternate embodiments, the SU location information and/or SU RF capabilities information can be sent to the LIWS in one or more messages which are separate from the request message.

In step 316, the old GW receives the inter-network location information relevant to an inter-network hand-off from the LIWS. In a preferred embodiment, the inter-network location information indicates whether the SU can access any alternative network (or networks). In addition, the inter-network location information includes location data for the SU which is converted from the old network format to the new network formats. In an alternate embodiment, the alternative networks and converted location information are included in a separate message. The process employed by the LIWS to determine the inter-network location information is described in detail in conjunction with FIG. 4.

A determination is made in step 318 whether any other network is available by evaluating the inter-network location information from the LIWS. When no other network is available, the old GW sends a hand-off denied message to the SU in step 336 and the procedure ends 338.

When another network is available or when the SU had specified a particular cell which the SU wished to access in step 304, the old GW sends a request for a hand-off to the new GW indicated in the inter-network hand-off information in step 320. In a preferred embodiment, the request includes converted SU location data in the new network format or the identification of the particular cell which the SU wished to access. The converted location data can alternatively be sent to the new GW in a separate message. In an alternate embodiment, the LIWS can send the converted location information directly to the new network and the old GW does not need to relay the converted location information.

The old GW receives a hand-off decision from the new GW in step 322. The decision-making process employed by the new GW is described in detail in conjunction with FIG. 5.

A determination is made in step 324 whether hand-off is approved by the new GW. When a hand-off is not approved, the old GW determines, in step 326, whether any other alternate networks indicated in the inter-network hand-off decision have yet to be tried. If not, the old GW sends a hand-off denied message to the SU in step 336 and the procedure ends 338. If so, steps 320–324 are repeated as shown in FIG. 3.

In a preferred embodiment, when hand-off is approved in step 324, the hand-off decision contains information describing the cell and channel of the new network to which the SU should hand-off. In alternate embodiment, the cell and channel information is sent in a separate message to the old GW.

When hand-off is approved, the old GW sends, in step 328, a hand-off command to the SU. In a preferred embodiment, the hand-off command includes the cell and channel information. In an alternate embodiment, the old GW sends the cell and channel information to the SU in a separate message.

After hand-off is complete, the old GW will receive a hand-off complete message from the new GW in step 330. The old GW then breaks its connection with the SU in step 332.

In step 334, the old GW forwards calls destined for the SU to the new network. Call forwarding can be requested by the new network, or the old network can automatically forward calls after the hand-off complete message is received. The procedure then ends 338.

Figure 4:
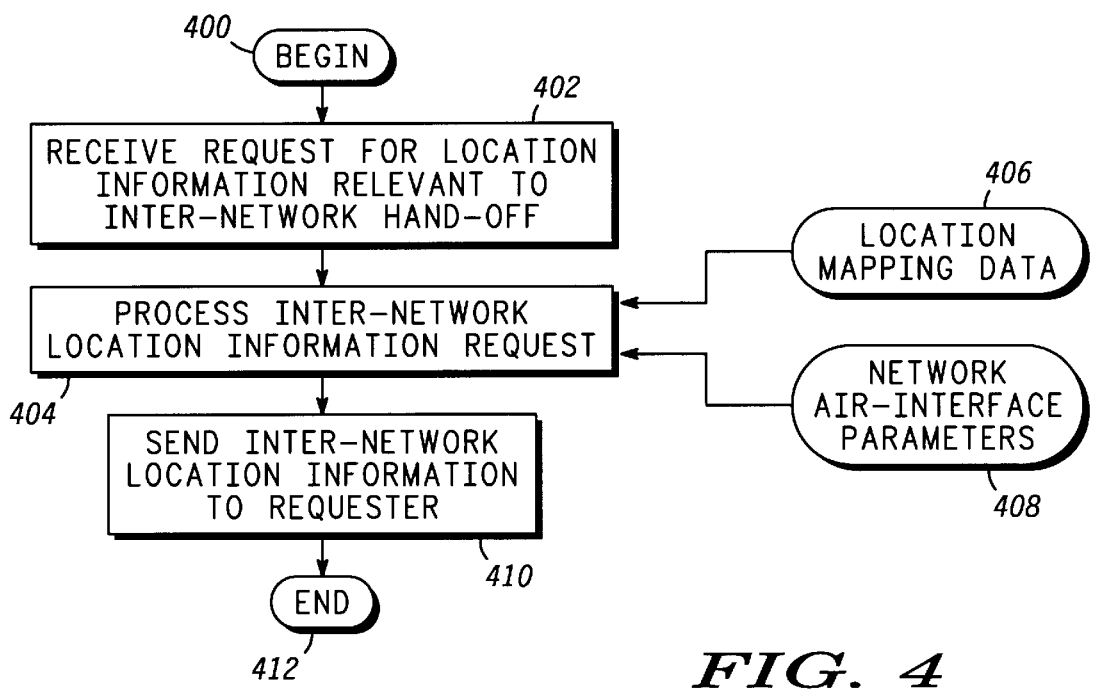
FIG. 4 illustrates a flowchart of a method for an LIWS to support call hand-off between networks in accordance with a preferred embodiment of the present invention.

FIG. 4 illustrates a flowchart of a method for an LIWS to support call hand-off between networks in accordance with a preferred embodiment of the present invention. The method begins 400 when the LIWS receives, in step 402, a request for location information relevant to an inter-network hand-off. In a preferred embodiment, the request is received from the old GW. In alternate embodiments, the request could be received from another GW or some other device.

The request for location information relevant to an inter-network hand-off includes SU location information and SU RF capabilities information in a preferred embodiment. In alternate embodiments, the SU location information and the SU RF capabilities information can be received in one or more separate messages.

After the LIWS receives the request for inter-network hand-off, the LIWS processes the request in step 404 to determine which network or networks could provide service to the SU given the SU RF capabilities and the SU location. The processing step 404 involves correlating the SU location information with location mapping data 406. The correlation indicates which, if any, alternative networks have coverage areas which could potentially serve the SU. The processing step 404 also involves comparing the SU RF capabilities information with air interface parameters 408 which describe the air interfaces used by the potential alternative networks. The result of step 404 is a list of networks, if any, which could provide service to the SU.

In step 410, inter-network location information relevant to an inter-network hand-off is sent to the requester, which is usually the old GW. If no other networks could possibly provide service to the SU, the inter-network location information will indicate that no other network is available. If any other networks could possibly provide service to the SU, the inter-network location information will indicate that another network is available. In a preferred embodiment, the LIWS sends a list of the one or more alternative networks to the old GW in the inter-network location information message. In addition, the LIWS sends location data for the SU which has been converted from the old network format to the new network formats. In alternate embodiments, the alternative network list and converted location data are sent in one or more separate messages. In another alternate embodiment, the LIWS sends the converted location data directly to the new network or networks. The procedure then ends 412.

Figure 5:
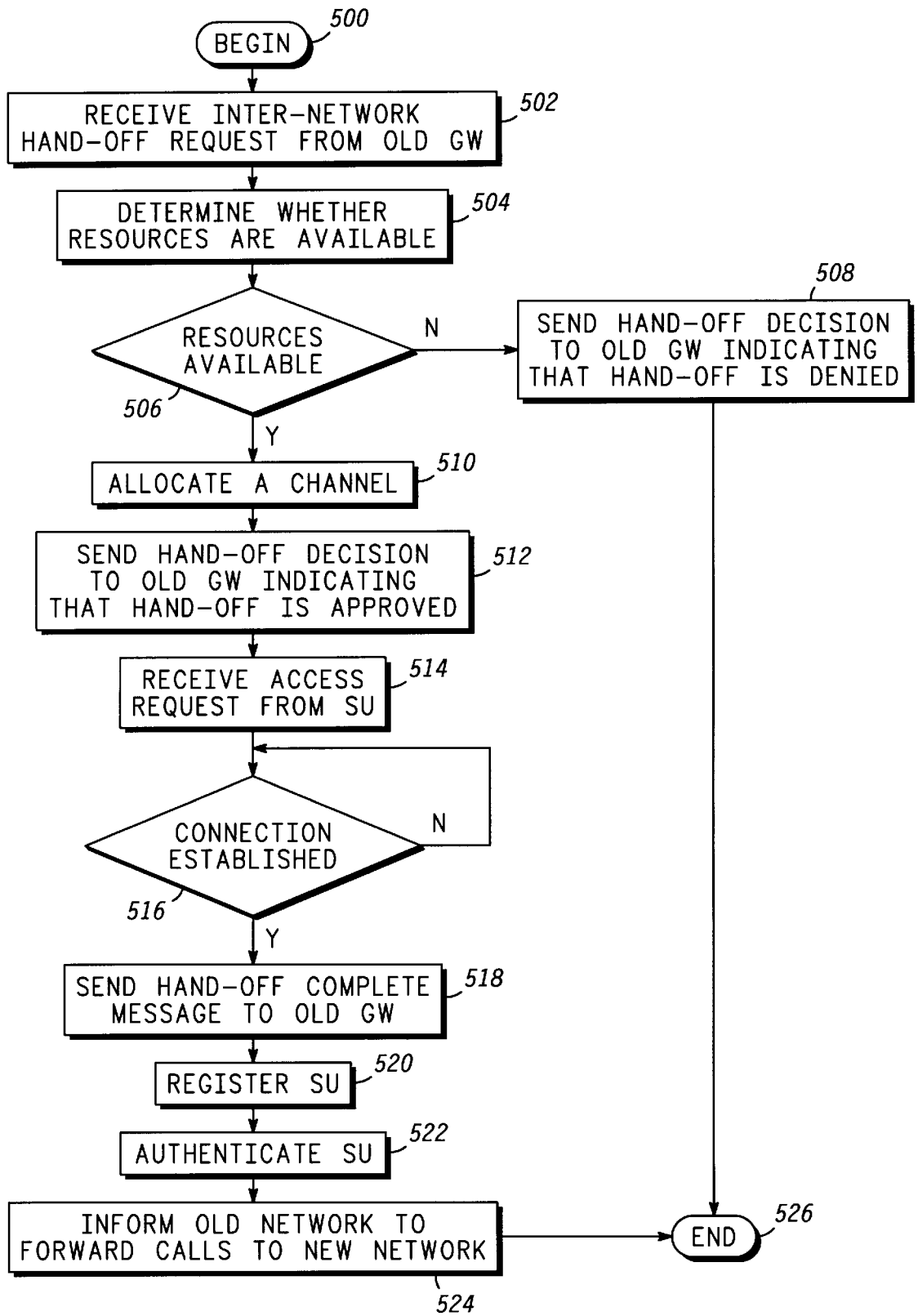
FIG. 5 illustrates a flowchart of a method for a new GW to enable a subscriber unit (SU) to hand-off a call between networks in accordance with a preferred embodiment of the present invention.

FIG. 5 illustrates a flowchart of a method for a new GW to enable an SU to hand-off a call between networks in accordance with a preferred embodiment of the present invention. The method begins 500 when the new GW receives an inter-network hand-off request from an old GW in step 502. In a preferred embodiment, the inter-network hand-off request includes SU location data converted into the new network format for the SU which is to be handed off to the new GW. In an alternate embodiment, the converted SU location data is received directly from the LIWS.

As described previously, an alternate embodiment includes an SU which can monitor multiple networks and send information which describes a new network cell in which the SU is located. In such an embodiment, the inter-network hand-off request includes the specific cell information rather than converted SU location data.

From the converted SU location data or the specific cell information, the new GW determines, in step 504, whether resources are available to provide service to the SU in the cell in which the SU is located. The new GW must be able to provide a channel to the SU in that cell.

The procedure branches in step 506 based on the determination made in step 504. When no resources are available, in step 508, the new GW sends a hand-off decision to the old GW which indicates that the hand-off has been denied and the procedure ends 526.

When resources are available, the new GW allocates a channel to the SU in step 510. Parameters describing the allocated channel might include, for example, a carrier frequency and timeslot. In step 512, a hand-off decision which indicates that hand-off is approved and which desirably includes the allocated channel parameters is sent to the old GW. In an alternate embodiment, the allocated channel parameters can be sent in a separate message.

After a time, an access request will be received from the SU in step 514. The access request is the result of the hand-off command from the old GW to the SU which was described in conjunction with step 328 of FIG. 3. In step 516, a determination is made whether a connection is established between the SU and the new GW. If not, the method iterates as shown in FIG. 5. If a connection is established, the new GW sends, in step 518, a hand-off complete message to the old GW.

In a preferred embodiment, the SU registers with the new GW in step 520 and is authenticated by the new GW in step 522. Registration is a process during which the new GW determines and stores the current location of the SU. Authentication involves determining whether the identity of the SU is valid with the new GW. Typically, speech is not connected until after registration and authentication is completed. However, for a network-to-network hand-off, this would result in an audio pause which might annoy system users.

In preferred embodiment, registration and/or authentication can be performed after the call is fully handed off in a manner which would be transparent to the SU user. In this manner, the conversation is not interrupted to perform the registration and authentication procedures. If, during the transparent registration and/or authentication procedures, the new network determines that the SU is not authorized to communicate using the new network, then service to the SU would then be terminated.

In an alternate embodiment, registration and authentication are performed in a manner which interrupts the conversation as described above. In another alternate embodiment, a pre-authentication method could be carried out by an SU at the outset of each call for every network which could possibly provide service to the SU during the duration of the call. The advantage would be that the call would not be interrupted during hand-off. However, the disadvantage is that the embodiment would result in greater system overhead messages for each network involved.

Referring back to FIG. 5, the new GW informs the old network to forward calls destined for the SU to the new network in step 524. In an alternate embodiment, the old GW will automatically forward calls to the new network after the old GW receives the hand-off complete message from the new GW. The procedure then ends 526.

Figure 6:
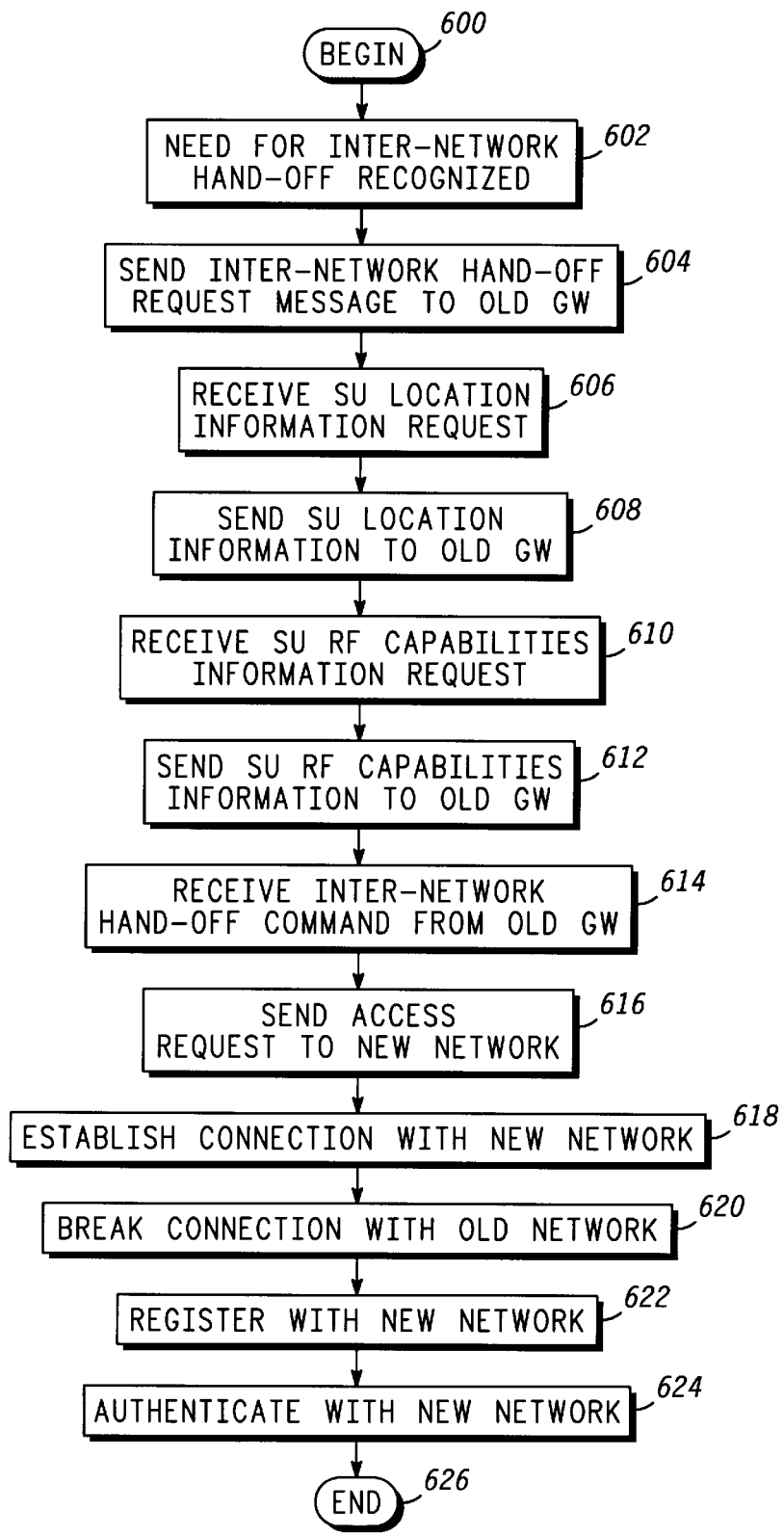
FIG. 6 illustrates a flowchart of a method for an SU to hand-off a call between networks in accordance with a preferred embodiment of the present invention.

FIG. 6 illustrates a flowchart of a method for an SU to hand-off a call between networks in accordance with a preferred embodiment of the present invention. The method begins 600 when a need for a hand-off is recognized in step 602. As described in conjunction with FIG. 3, the need for a hand-off can be recognized by the SU or a GW servicing the SU. When the need for a hand-off is recognized by the SU, the SU sends an inter-network hand-off request to the old GW in step 604.

As described previously, in one embodiment, the SU is capable of determining which cell or cells of an alternate network or networks the SU is located within. When the SU has this capability, the SU sends information describing the cell or cells to the GW. The information can be sent in the inter-network hand-off request or in a separate message.

In another embodiment, the SU sends SU location information and/or SU RF capabilities information to the old GW. This information can be sent by the SU automatically, or can be sent after receiving requests for the information from the old GW. If the information is sent automatically, it can be included in the request for inter-network hand-off message or in one or more separate messages.

If the information is requested by the GW, steps 606–612 are performed. In step 606, the SU receives a request for SU location information. The SU or the network can determine location information in multiple ways. For example, the SU can determine its location based on which cell of the old network or a second network the SU is located within. The SU could also give its position up in terms of the cell site of another network. Alternatively, the SU can determine its location using geolocation or other triangularization techniques. Whatever the form of the SU location information, in a preferred embodiment, the location information is sent to the old GW in step 608.

The SU receives a request for SU RF capabilities in step 610. The SU sends a message to the old GW which includes its RF capabilities in step 612. When the SU has the ability to communicate using differing air interface standards, the SU RF capabilities can be arranged by the SU in a manner which indicates an air interface standard, and thus a particular type of network, which the SU prefers to use. Preference can be based on signal quality, service rates, or any other relevant factors.

In another embodiment, the old GW maintains SU location and/or SU RF capabilities information in a database and steps 606–612 are not necessary. Alternatively, the old network can use some other method of determining SU location and/or SU RF capabilities without interaction with the SU. As explained previously, the particular way which the old GW determines SU location and/or SU RF capabilities is not critical to the present invention. The order of steps 606–612 also is not critical and can be varied in alternate embodiments.

In step 614, the SU receives an inter-network hand-off command from the old GW as was discussed in conjunction with step 328 of FIG. 3. In a preferred embodiment, the inter-network hand-off command includes channel parameters which the SU should use to attempt a hand-off to the new network. The SU sends an access request to the new network in step 616 and performs tasks associated with establishing a connection with the new network in step 618.

After a connection with the new network is established, the connection with the old network is broken in step 620. As described in conjunction with steps 520 and 522 of FIG. 5, the SU then registers with the new network in step 622 and is authenticated in step 624. The procedure then ends 626.

Figure 7:
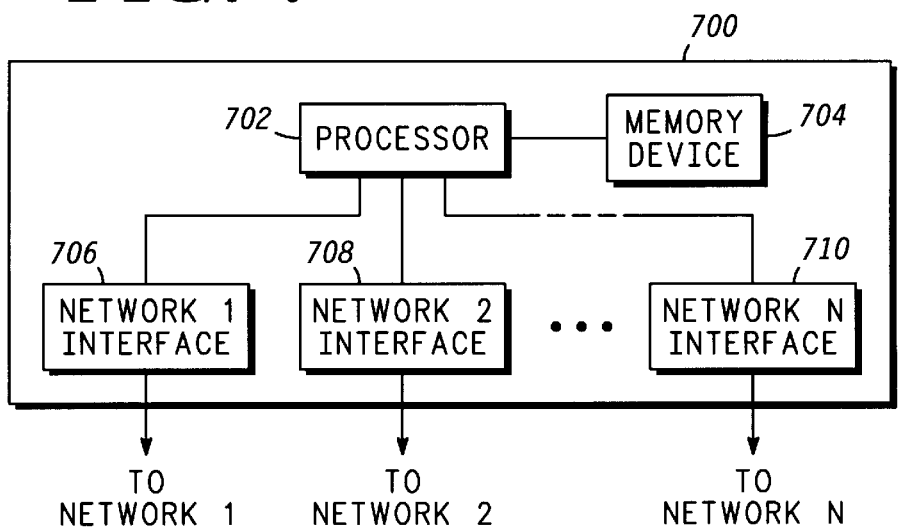
FIG. 7 illustrates an LIWS in accordance with a preferred embodiment of the present invention.

FIGS. 3–6 illustrate methods for handing off an SU between networks having differing air interface standards and/or locational standards. Preferred embodiments of the apparatus of the present invention are depicted in FIGS. 7–9. FIG. 7 illustrates LIWS 700 in accordance with a preferred embodiment of the present invention. LIWS 700 includes processor 702, memory device 704, and multiple network interfaces 706–710. Network interfaces 706–710 enable multiple networks to access LIWS to gain location inter-working information. For example, network 1 interface 706 could connect to a satellite radio telecommunication network and network 2 interface 708 could connect to a terrestrial radio telecommunication network. Although FIG. 7 illustrates three network interfaces 706–710, more or fewer network interfaces can be used, depending on how many networks are supported.

Each network interface 706–710 is coupled to processor 702. In a preferred embodiment, location mapping data, network coverage area information, and network air interface standards for each network are stored in memory device 704. This data is updated as needed when each network's information changes. Processor 702 uses this data to provide location inter-working information to the various networks. The functions performed by processor 702 have been described in detail in conjunction with FIG. 4.

FIG. 8 illustrates multi-mode SU 800 in accordance with a preferred embodiment of the present invention. SU 800 includes processor 802 and memory device 804. In a preferred embodiment, SU 800 also includes RF interfaces 806–810. Memory device 804 is coupled to processor 802 and is used to store information necessary for SU 800 to inter-work with varying networks.

In a preferred embodiment, processor 802 can generate an RF capabilities message which indicates which modulation schemes and frequency bands SU 800 is capable of communicating over. Processor 802 can also generate an SU location information message which contains information describing the location of SU 800. In another preferred embodiment, processor 802 can monitor location information (e.g., cell identification information) from multiple networks in order to provide finer-cell location information to an LIWS. The information generated or gathered by SU 800 can be included together in messages in various combinations. In a preferred embodiment, the messages are sent to an LIWS through a GW with which SU 800 is communicating.

Each RF interface 806–810 includes equipment necessary for SU 800 to communicate using a particular air interface. For example, RF interface 806 could enable SU 800 to communicate using GSM in the 900 MHz frequency range. RF interface 808 could enable SU 800 to communicate using TDMA in the 1900 MHz frequency range. Although RF interfaces 806–810 are shown as separate boxes in FIG. 8, they could alternatively be combined into a single, configurable interface.

In an alternate embodiment, SU 800 can operate using only a single air interface. SU 800 would still be able to take advantage of the applications for the present invention where various networks use differing locational standards, but not differing air interfaces.

FIG. 9 illustrates GW 900 in accordance with a preferred embodiment of the present invention. GW 900 represents a GW in either a terrestrial-based or satellite-based network. Although the equipment for differing networks varies, the functionality of GW 900 in accordance with the present invention is basically the same. GW 900 includes Base Station Subsystem 902 (BSS), Mobile Switching Center 904 (MSC), and location registers 906. Although BSS and MSC are names of devices familiar to those of skill in the art, the functions of the BSS and MSC for the purposes of this description are explained below. Limitations associated with the use of these names in other contexts are not intended to limit the scope of the present invention.

GW 900 communicates either directly or indirectly with SUs via RF interface 908. In a terrestrial network, RF interface 908 provides a direct link to SUs. In a satellite network, RF interface 908 communicates with SUs through satellites.

BSS 902 provides and manages transmission paths between SUs and MSC 904. MSC 904 is a point where communications transit between GW 900 and another network (e.g., a PSTN or other communication network). In a preferred embodiment, location registers 906 are coupled to MSC 904. Location registers 906 are typically one or more memory storage devices which contain the last known locations of SUs supported by the network. An SU location is obtained during a location updating procedure with the SU or after requesting location inter-working information from an LIWS in accordance with a preferred embodiment of the present invention.

GW 900 is coupled to LIWS 910 which can be remote or co-located with GW 900. In a preferred embodiment, BSS 902 is connected to LIWS 910. This enables BSS 902 to screen network access attempts before they are sent to MSC 904. In a preferred embodiment, BSS 902 relays to LIWS 910 an RF capabilities message from the SU which indicates which modulation schemes and frequency bands the SU is capable of communicating over. BSS 902 also relays to LIWS 910 an SU location information message from the SU which contains information describing the location of SU.

In alternate embodiments, BSS 902 has access to SU RF capabilities information and/or location information (e.g., through a direct or indirect connection with location registers 906) and does not need to receive this information from the SU. In these embodiments, BSS 902 (rather than the SU) can generate the SU RF capabilities message and/or the SU location information.

Basically, BSS 902 accesses LIWS 910 to obtain location inter-working information so that enhanced service can be provided to SUs as described in detail in the description.

FIG. 10 illustrates a GW in accordance with an alternate embodiment of the present invention. In this alternate embodiment, MSC 904 (rather than BSS 902) is connected to LIWS 910. Whether BSS 902 or MSC 904 acts as an LIWS interface, GW 900 is able to get location inter-working information for an SU. In this alternate embodiment, MSC 904 is capable of creating or relaying RF capabilities and/or location messages and accessing LIWS 910 to achieve the advantages of the present invention.

In summary, the method and apparatus of the present invention enables location inter-working information to be shared by multiple networks which use differing locational standards. The location inter-working information enables an SU to be handed-off between multiple networks having different air interface standards or using differing locational standards which was not possible with prior-art systems.

What is claimed is:

1. A method for supporting a hand-off of a subscriber unit (SU) from a first network to an alternate network, wherein the first network describes a location of the SU using first location information in a first locational format which is used by the first network, the method comprising the steps of:
    a) receiving a request for location information relevant to the hand-off;
    b) receiving the first location information in the first locational format;
    c) correlating the first location information with location mapping data to determine a list of alternate networks which have coverage areas that encompass the SU, wherein the location mapping data describes the coverage areas of the alternate networks;
    d) when at least one alternate network is in the list, sending the list to a device that sent the request; and
    e) when no alternate network is in the list, sending an indication to the device that sent the request which indicates that there is no alternate network to which the SU can hand-off.

2. The method for supporting the hand-off as claimed in claim 1, further comprising the steps of:
    f) determining additional location information for the at least one alternate network by correlating the first location information with the location mapping data, wherein the additional location information describes the location of the SU using locational formats of the at least one alternate network; and
    g) sending the additional location information to the device that sent the request so that the additional location information can be used during the hand-off.

3. A method for handing-off a subscriber unit (SU) from a first network to an alternate network, wherein the first network describes a location of the SU using first location information in a first locational format which is used by the first network, the method comprising the steps of:
    a) sending the first location information to a location inter-working server (LIWS);
    b) receiving, from the LIWS in response to sending the first location information, a list of alternate networks which have coverage areas that encompass the SU;
    c) determining whether the list indicates that at least one alternate network has a coverage area that encompasses the SU; and
    d) when the list indicates that the at least one alternate network has the coverage area that encompasses the SU, allowing the SU to attempt to hand-off to a second network of the at least one alternate network.

4. The method for handing-off the SU as claimed in claim 3, further comprising the step of:
    e) receiving, from the LIWS, converted location data in a second locational format which is used by the second network; and
wherein the step d) of allowing the SU to attempt to hand-off comprises the step of sending the converted location data to the second network.

5. The method for handing-off the SU as claimed in claim 3, further comprising the steps of:
    e) determining whether the SU is successful in handing-off to the second network;
    f) when the SU is not successful, determining whether the list indicates that a hand-off attempt to another alternate network has yet to be tried; and
    g) when the list indicates that the hand-off attempt to the another alternate network has yet to be tried, allowing the SU to attempt to hand-off to the another alternate network.

6. The method for handing-off the SU as claimed in claim 5, wherein the list indicates a preferential order in which attempts to hand-off to the at least one alternate network should be made, and step d) comprises the step of:
    d1) allowing the SU to attempt to hand-off to a most preferred of the at least one alternate network as indicated by the preferential order, and
wherein step g) comprises the step of:
    g1) allowing the SU to attempt to hand-off to a next most preferred of the at least one alternate network as indicated by the preferential order.

7. The method for handing-off the SU as claimed in claim 3, further comprising the step of:
    e) receiving a request from the SU to initiate a hand-off between the first network and the alternate network; and
wherein the step a) of sending the first location information is performed in response to the request.

8. The method for handing-off the SU as claimed in claim 3, further comprising the step of:
    e) receiving the first location information from the SU prior to sending the first location information to the LIWS.

9. The method for handing-off the SU as claimed in claim 3, further comprising the step of:
    e) sending, to the LIWS, SU radio-frequency (RF) capabilities information which describes air interfaces over which the SU is capable of communicating so that the LIWS can include in the list only compatible networks which have the air interfaces which are compatible with the SU RF capabilities information.

10. The method for handing-off the SU as claimed in claim 3, further comprising the steps of:
   e) correlating the at least one alternate network with SU radio-frequency (RF) capabilities information which describes air interfaces over which the SU is capable of communicating; and
   f) sorting from the list incompatible networks of the at least one alternate network, wherein the incompatible networks are those networks which do not use one of the air interfaces over which the SU is capable of communicating.

11. The method for handing-off the SU as claimed in claim 3, further comprising the steps of:
   e) sending, by the first network, a hand-off request to the second network;
   f) receiving, from the second network, a decision whether the second network will allow the SU to hand-off to the second network; and
   g) when the decision indicates that the second network will allow the SU to hand-off to the second network, handing-off the SU to the second network.

12. The method for handing-off the SU as claimed in claim 11, wherein step g) comprises the steps of:
   g1) sending a hand-off command to the SU which indicates that the SU should hand-off to the second network;
   g2) receiving a hand-off complete message from the second network which indicates that the SU has successfully completed handing-off to the second network; and
   g3) breaking a connection with the SU in response to the hand-off complete message.

13. The method for handing-off the SU as claimed in claim 12, further comprising the step of:
   h) forwarding calls destined for the SU to the second network.

14. A method for handing-off a subscriber unit (SU) from a first network to a second network, the method comprising the steps of:
   a) sending, by the first network, a hand-off request to the second network, wherein the hand-off request includes first location information describing a location of the SU converted into a locational standard used by the second network to describe locations of subscriber units;
   b) receiving from the second network, a decision whether the second network will allow the SU to hand-off to the second network, wherein the decision was based on the first location information; and
   c) when the decision indicates that the second network will allow the SU to hand-off to the second network, handing-off the SU to the second network.

15. The method for handing-off the SU as claimed in claim 14, further comprising the steps of:
   d) receiving, by the first network, a first request from the SU to hand-off to the second network, wherein the first request includes an identification of a particular cell of the second network to which the SU wants to hand-off;
   e) sending, to the second network, the identification of the particular cell; and
   wherein the step b) of receiving the decision comprises the step of:
   b1) receiving the decision whether the second network will allow the SU to hand-off to the particular cell.

16. The method for handing-off the SU as claimed in claim 14, further comprising the steps of:
   d) sending, to a location inter-working server (LIWS), second location information which describes the location of the SU in a locational standard used by the first network;
   e) receiving, from the LIWS, the first location information in the second network format after the LIWS converted the second location information into the first location information; and
   wherein step a) of sending the hand-off request comprises the step of:
   a1) sending the hand-off request with the first location information.

17. The method for handing-off the SU as claimed in claim 14, further comprising the steps of:
   d) determining, by the first network, that a network outage will affect service provided to the SU by the first network; and
   e) determining that the first network will attempt to hand-off the SU to the second network as a result of the network outage.

18. The method for handing-off the SU as claimed in claim 14, further comprising the steps of:
   d) determining, by the first network, that the first network is reaching a channel capacity of the first network; and
   e) determining that the first network will attempt to hand-off the SU to the second network as a result of reaching the channel capacity.

19. A method for handing-off a subscriber unit (SU) from a first network to a second network, the method comprising the steps of:
   a) sending, by the first network, a hand-off request to the second network, wherein the hand-off request includes location information describing a location of the SU converted into a locational standard used by the second network to describe locations of subscriber units;
   b) receiving from the second network, channel information indicating a channel provided by the second network to which the second network will allow the SU to hand-off, wherein the channel information was determined based on the location information; and
   c) sending, by the first network, the channel information to the SU so that the SU can hand-off to the channel identified by the channel information.

20. A method for handing-off a subscriber unit (SU) from a first network to a second network, wherein a first locational format used by the first network to describe a location of the SU differs from a second locational format used by the second network to describe the location of the SU, the method comprising the steps of:
   a) receiving, by the second network, location information describing the location of the SU in the second locational format;
   b) determining whether the second network has a channel which the second network can allocate to the SU at the location;
   c) when the second network has the channel, sending a hand-off decision to the first network which indicates that a hand-off is approved; and
   d) establishing a connection with the SU using the channel.

21. The method for handing-off the SU as claimed in claim 20, further comprising the step of:
   e) sending information describing the channel to the first network so that the first network can inform the SU the channel the SU should hand-off.

22. The method for handing-off the SU as claimed in claim 20, further comprising the steps of:

e) sending speech on the channel after the connection is established;

f) authenticating the SU on the second network to determine whether the SU is authorized to communicate using the second network; and g) when the SU is not authorized to communicate using the second network, terminating service to the SU.

23. A method for a subscriber unit (SU) to hand-off from a first network to a second network, wherein the first network describes a location of the SU in a first locational format and the second network describes the location of the SU in a second locational format, the method comprising the steps of:

a) receiving a hand-off command from the first network which indicates that the SU should hand-off to the second network;

b) receiving a channel of the second network to which the SU should hand-off;

c) establishing a connection with the second network using the channel; and d) breaking a connection with the first network.

24. The method for the SU to hand-off as claimed in claim 23, further comprising the steps of:

e) determining, by the SU, that the SU desires to hand-off to the second network; and f) sending, to the first network, a request to hand-off to the second network.

25. The method for the SU to hand-off as claimed in claim 24, further comprising the steps of:

g) determining, by the SU, information identifying a cell of the second network to which the SU desires to hand-off; and h) sending the information identifying the cell to the first network.

26. The method for the SU to hand-off as claimed in claim 24, further comprising the step of:

g) sending, to the first network, first location information in the first locational format when the SU determines that the SU desires to hand-off to the second network.

27. The method for the SU to hand-off as claimed in claim 23, further comprising the steps of:

e) receiving a request from the first network for first location information which describes the location of the SU in the first locational format; and f) sending the first location information to the first network in response to the request.

28. The method for handing-off the SU as claimed in claim 23, further comprising the steps of:

e) sending speech on the channel after the connection with the second network is established;

f) authenticating with the second network to determine whether the SU is authorized to communicate using the second network; and g) when the SU is not authorized to communicate using the second network, having service to the SU terminated.

29. A method for a subscriber unit (SU) to hand-off from a first network to a second network, wherein the first network describes a location of the SU using a first locational standard and the second network describes the location of the SU using a second locational standard, the method comprising the steps of:

a) determining, by the SU, that the SU desires to hand-off to the second network;

b) determining that the SU is located within a cell of the second network;

c) sending, to the first network, a request to hand-off to the second network;

d) sending information identifying the cell to the second network;

e) receiving a hand-off command from the first network which indicates that the SU can attempt to hand-off to the second network;

f) establishing a connection with the second network within the cell; and g) breaking a connection with the first network.

30. A method for a subscriber unit (SU) to hand-off from a first network to a second network, wherein the first network describes a location of the SU using a first locational standard and the second network describes the location of the SU using a second locational standard, the method comprising the steps of:

a) determining, by the SU, that the SU desires to hand-off to the second network because the second network offers a lower service rate than a service rate of the first network;

b) sending, to the first network, a request to hand-off to the second network;

c) receiving a hand-off command from the first network which indicates that the SU can attempt to hand-off to the second network;

d) establishing a connection with the second network; and e) breaking a connection with the first network.

31. A location inter-working server (LIWS) which is adapted to interface with at least one communication network, the LIWS comprising:

a processor for receiving a request for location information relevant to a hand-off of a subscriber unit (SU) between a first network and an alternate network, receiving first location information which is in a first location format used by the first network and which describes a location of the SU, and correlating the first location information with location mapping data to determine a list of at least one alternate network which has a coverage area that encompasses the SU, wherein the location mapping data describes the coverage area of the at least one alternate network;

a memory device coupled to the processor for storing the location mapping data; and at least one network interface coupled to the processor for interfacing the LIWS with at least the first network so that information can be exchanged between the LIWS and at least the first network.

32. A gateway adapted to provide communications capabilities to a subscriber unit (SU) in a first communication network, the gateway comprising:

a location inter-working server (LIWS) interface for sending first location information describing a location of the SU to an LIWS, wherein the first location information is in a first location format used by the first communication network, the LIWS interface also for receiving from the LIWS in response to sending the first location information a list of alternate networks which have coverage areas that encompass the SU and, when the list indicates that at least one alternate network in the list has a coverage area that encompasses the SU, allowing the SU to attempt to hand-off to the at least one alternate network.

33. A subscriber unit (SU) comprising:

a processor for receiving a hand-off command from a first communication network which indicates that the SU can hand-off to an alternate communication network, wherein the first communication network uses a first locational standard to define a location of the SU and the alternate communication network uses a second locational standard to define the location of the SU and the hand-off command is received when a conversion by a location inter-working server (LIWS) of first location data in the first locational standard to second location data in the second locational standard indicates that the alternate communication network has a coverage area which encompasses the SU, the processor also for receiving a channel of the alternate communication network to which the SU should hand-off, and for establishing a connection with the alternate communication network using the channel; and a radio frequency (RF) interface coupled to the processor for communicating with the first communication network.

34. The SU as claimed in claim 33, further comprising:

a memory device coupled to the processor for storing the first location data which describes the location of the SU using the first locational standard;

and wherein the processor is further for sending the first location data to the first communication network.

35. The SU as claimed in claim 33, further comprising:

a memory device coupled to the processor for storing SU radio frequency (RF) capabilities information which describes which air interfaces the SU is capable of communicating over;

and wherein the processor is further for sending the SU RF capabilities information to the first communication network.

36. The SU as claimed in claim 33, further comprising:

at least one additional RF interface coupled to the processor for enabling the SU to determine a cell of the alternate communication network within which the SU is located;

and wherein the processor is further for sending information identifying the cell to the first communication network.

37. A communication network comprising:

at least one subscriber unit (SU) whose location is described by the communication network in a first locational format; and a gateway for providing communication channels to the at least one SU, the gateway being adapted to interface with a location inter-working server (LIWS) so that, when a hand-off of an SU from the communication network to a second communication network is desired, the gateway can send location data describing the location of the SU in the first locational format to the LIWS and the gateway can receive, from the LIWS, location information relevant to the hand-off and, when the gateway receives the location information from the LIWS, the gateway is further for handing-off the SU to the second communication network when the location information indicates that the second communication network has a coverage area that encompasses the SU.

38. The communication network as claimed in claim 37, further comprising the LIWS.

\* \* \* \* \*